(12) United States Patent
Kumar et al.

(10) Patent No.: US 9,762,474 B2
(45) Date of Patent: Sep. 12, 2017

(54) SYSTEMS AND METHODS FOR SELECTING A ROUTER TO CONNECT A BRIDGE IN THE NETWORK ON CHIP (NOC)

(71) Applicant: NetSpeed Systems, San Jose, CA (US)

(72) Inventors: Sailesh Kumar, San Jose, CA (US); Eric Norige, East Lansing, MI (US); Pier Giorgio Raponi, San Jose, CA (US)

(73) Assignee: NETSPEED SYSTEMS, San Jose, CA (US)

( * ) Notice: Subject to any disclaimer, the term of this patent is extended or adjusted under 35 U.S.C. 154(b) by 499 days.

(21) Appl. No.: 14/246,940

(22) Filed: Apr. 7, 2014

(65) Prior Publication Data

US 2015/0288596 A1    Oct. 8, 2015

(51) Int. Cl.
| | |
|---|---|
| *H04L 12/721* | (2013.01) |
| *H04L 12/937* | (2013.01) |
| *H04L 12/727* | (2013.01) |
| *H04L 12/733* | (2013.01) |

(52) U.S. Cl.
CPC .......... *H04L 45/121* (2013.01); *H04L 45/126* (2013.01)

(58) Field of Classification Search
None
See application file for complete search history.

(56) References Cited

U.S. PATENT DOCUMENTS

| | | |
|---|---|---|
| 5,432,785 A | 7/1995 | Ahmed et al. |
| 5,764,740 A | 6/1998 | Holender |
| 5,991,308 A | 11/1999 | Fuhrmann et al. |
| 6,003,029 A | 12/1999 | Agrawal et al. |
| 6,249,902 B1 | 6/2001 | Igusa et al. |
| 6,415,282 B1 | 7/2002 | Mukherjea et al. |
| 6,925,627 B1 | 8/2005 | Longway et al. |
| 7,065,730 B2 | 6/2006 | Alpert et al. |
| 7,318,214 B1 | 1/2008 | Prasad et al. |
| 7,590,959 B2 | 9/2009 | Tanaka |
| 7,725,859 B1 | 5/2010 | Lenahan et al. |
| 7,808,968 B1 | 10/2010 | Kalmanek, Jr. et al. |
| 7,917,885 B2 | 3/2011 | Becker |
| 8,050,256 B1 | 11/2011 | Bao et al. |

(Continued)

FOREIGN PATENT DOCUMENTS

| | | |
|---|---|---|
| CN | 103684961 A | 3/2014 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — Duc Duong
(74) *Attorney, Agent, or Firm* — Procopio, Cory, Hargreaves & Savitch LLP

(57) ABSTRACT

The present disclosure is directed to systems and methods for connecting hosts to any router by the use of bridges. Example implementations described herein are directed to determining connections between routers and hosts based on the topology of the NoC and cost functions. Unused routers may also be removed from the NoC configuration and unused directional host ports of routers may be utilized to connect hosts together depending on a cost function and the desired implementation.

16 Claims, 13 Drawing Sheets

(56) References Cited

U.S. PATENT DOCUMENTS

| | | | |
|---|---|---|---|
| 8,059,551 B2 | 11/2011 | Milliken | |
| 8,099,757 B2 | 1/2012 | Riedle et al. | |
| 8,136,071 B2 | 3/2012 | Solomon | |
| 8,270,316 B1* | 9/2012 | Chang | G06F 15/7842 370/254 |
| 8,281,297 B2 | 10/2012 | Dasu et al. | |
| 8,312,402 B1 | 11/2012 | Okhmatovski et al. | |
| 8,448,102 B2 | 5/2013 | Kornachuk et al. | |
| 8,492,886 B2 | 7/2013 | Or-Bach et al. | |
| 8,541,819 B1 | 9/2013 | Or-Bach et al. | |
| 8,543,964 B2 | 9/2013 | Ge et al. | |
| 8,601,423 B1 | 12/2013 | Philip et al. | |
| 8,635,577 B2 | 1/2014 | Kazda et al. | |
| 8,667,439 B1* | 3/2014 | Kumar | G06F 17/5031 716/106 |
| 8,717,875 B2 | 5/2014 | Bejerano et al. | |
| 2002/0071392 A1 | 6/2002 | Grover et al. | |
| 2002/0073380 A1 | 6/2002 | Cooke et al. | |
| 2002/0095430 A1 | 7/2002 | Egilsson et al. | |
| 2004/0216072 A1 | 10/2004 | Alpert et al. | |
| 2005/0147081 A1 | 7/2005 | Acharya et al. | |
| 2006/0161875 A1 | 7/2006 | Rhee | |
| 2007/0118320 A1 | 5/2007 | Luo et al. | |
| 2007/0244676 A1 | 10/2007 | Shang et al. | |
| 2007/0256044 A1 | 11/2007 | Coryer et al. | |
| 2007/0267680 A1 | 11/2007 | Uchino et al. | |
| 2008/0072182 A1 | 3/2008 | He et al. | |
| 2008/0120129 A1 | 5/2008 | Seubert et al. | |
| 2009/0070726 A1 | 3/2009 | Mehrotra et al. | |
| 2009/0245257 A1* | 10/2009 | Comparan | H04L 45/00 370/392 |
| 2009/0268677 A1 | 10/2009 | Chou et al. | |
| 2009/0313592 A1 | 12/2009 | Murali et al. | |
| 2010/0040162 A1 | 2/2010 | Suehiro | |
| 2011/0035523 A1 | 2/2011 | Feero et al. | |
| 2011/0060831 A1 | 3/2011 | Ishii et al. | |
| 2011/0069612 A1* | 3/2011 | Yamaguchi | H04L 45/12 370/225 |
| 2011/0072407 A1 | 3/2011 | Keinert et al. | |
| 2011/0154282 A1 | 6/2011 | Chang et al. | |
| 2011/0276937 A1 | 11/2011 | Waller | |
| 2012/0022841 A1 | 1/2012 | Appleyard | |
| 2012/0023473 A1 | 1/2012 | Brown et al. | |
| 2012/0026917 A1 | 2/2012 | Guo et al. | |
| 2012/0110541 A1 | 5/2012 | Ge et al. | |
| 2012/0155250 A1 | 6/2012 | Carney et al. | |
| 2013/0051397 A1 | 2/2013 | Guo et al. | |
| 2013/0080073 A1 | 3/2013 | de Corral | |
| 2013/0103369 A1 | 4/2013 | Huynh et al. | |
| 2013/0151215 A1 | 6/2013 | Mustapha | |
| 2013/0159944 A1 | 6/2013 | Uno et al. | |
| 2013/0174113 A1 | 7/2013 | Lecler et al. | |
| 2013/0207801 A1 | 8/2013 | Barnes | |
| 2013/0219148 A1 | 8/2013 | Chen et al. | |
| 2013/0235877 A1* | 9/2013 | Bhardwaj | H04L 45/38 370/401 |
| 2013/0263068 A1 | 10/2013 | Cho et al. | |
| 2013/0326458 A1 | 12/2013 | Kazda et al. | |
| 2014/0068132 A1 | 3/2014 | Philip et al. | |
| 2014/0092740 A1 | 4/2014 | Wang et al. | |
| 2014/0098683 A1 | 4/2014 | Kumar et al. | |
| 2014/0115218 A1 | 4/2014 | Philip et al. | |
| 2014/0115298 A1 | 4/2014 | Philip et al. | |
| 2014/0177473 A1* | 6/2014 | Kumar | H04L 45/04 370/255 |
| 2014/0328208 A1* | 11/2014 | Norige | H04L 45/06 370/254 |
| 2015/0036536 A1* | 2/2015 | Kumar | H04L 41/12 370/254 |
| 2015/0220470 A1* | 8/2015 | Chen | H04L 49/109 710/105 |
| 2015/0331831 A1* | 11/2015 | Solihin | H04L 49/109 709/212 |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA Memo 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, Pact '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

* cited by examiner

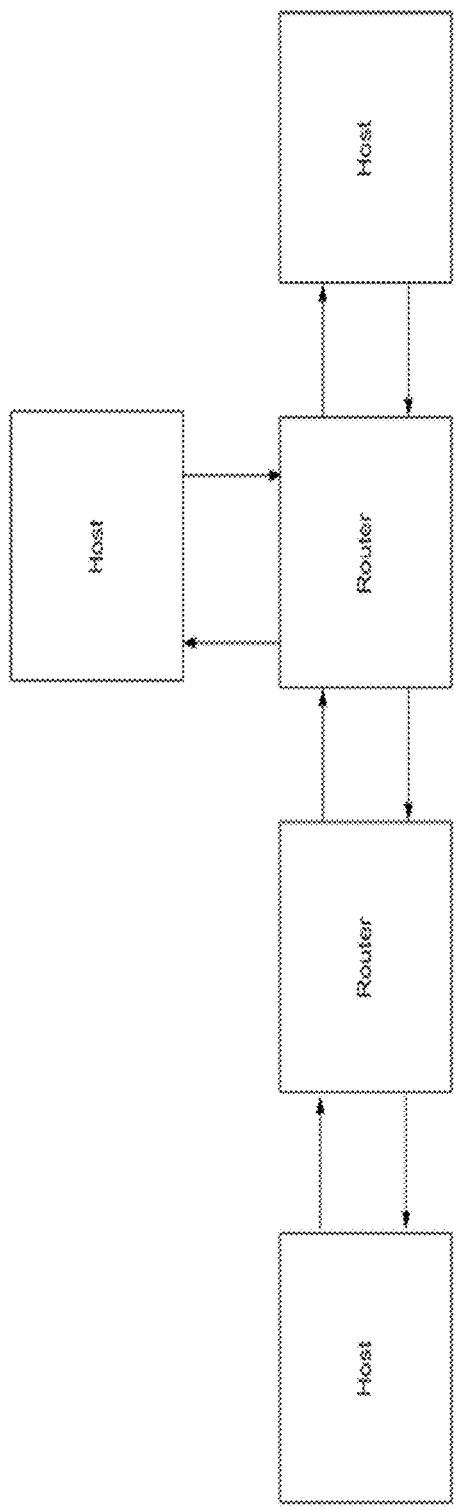
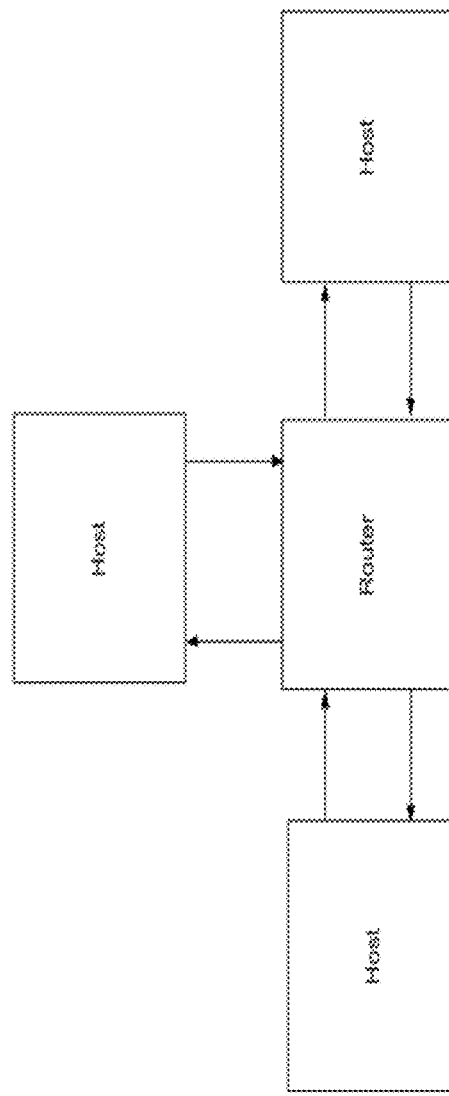
FIG. 7(a)
FIG. 7(b)

SYSTEMS AND METHODS FOR SELECTING A ROUTER TO CONNECT A BRIDGE IN THE NETWORK ON CHIP (NOC)

BACKGROUND

Technical Field

Methods and example implementations described herein are directed to interconnect architecture, and more specifically, providing systems and methods for selecting a router to connect a bridge in the Network on Chip (NoC).

Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs).

VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and send the message from host to the NoC layer, and also perform arbitration and multiplexing between incoming messages from the two NoC layers and deliver them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

As described above, the NoC generally involves a network of routers that are connected to each other in some topology. The NoC is designed to connect various hosts, also interchangeably referred to as agents hereinafter, to the system, wherein bridges can be used to connect a router to a host. The bridge logic of the bridge may facilitate the conversion of messages from a host protocol to the NoC protocol. Bridges can include one or multiple connections, and a host may need one or more NoC connections based on the number of hosts, number of ports, and bandwidth availability. Bridges can provide flexibility for routers to freely connect to desired hosts.

However, related art implementations connect a host to a router in northwest corner, with each router having one host attached to the router, as configuring a NoC to connect multiple hosts to a router is mostly a manual process and leads to increased complexity in the NoC design.

SUMMARY

The present disclosure is directed to a method for configuring a Network on Chip (NoC) by determining one or more routers in the NoC that do not conduct arbitration between one or more channels of the NoC and remove the determined routers that do not conduct arbitration between the one or more channels of the NoC. The method can further be configured to reconnect hosts/agents of the channels associated with the removed routers to another router and/or bridge of a plurality of routers and bridges in the NoC. In another aspect of the present disclosure, the proposed method can further include determining a second set of routers that serve two directions only for the propose of I/O, removing the determined second set of routers, and directly connecting hosts that were earlier associated through the second set of routers. In yet another aspect of the present disclosure, the method can further include configuration of each unused directional port of one or more routers to connect with one or more hosts of the NoC during removal of the above-determined routers that do not conduct arbitration between the one or more hosts of the NoC.

Aspect of present application may include a computer readable storage medium storing instructions for executing a process. The instructions may involve determining one or more routers in the NoC that do not conduct arbitration between one or more channels of the NoC. The instructions can further involve removing the determined routers that do not conduct arbitration between the one or more channels of the NoC. In an embodiment, the instructions can still further involve reconnecting hosts/agents of the channels associated with the removed routers to another router and/or bridge of a plurality of routers and bridges in the NoC.

Aspects of the present application may include a system, which involves, a processor that can be configured to execute one or more modules including an arbitration-based router detection module, router removal module, and a host reconnection module. In an embodiment, arbitration-based router detection module can be configured to determine one or more routers in a given NoC interconnect architecture that do not conduct arbitration between one or more channels of the NoC. Router removal module, on the other hand, can be configured to remove the determined routers that do not conduct arbitration between the one or more channels of the NoC. Host reconnection module, on the other hand, can be configured to reconnect hosts/agents of the channels associated with the removed routers to another router and/or bridge of a plurality of routers and bridges in the NoC.

BRIEF DESCRIPTION OF THE DRAWINGS

FIGS. 7(a) and 7(b) illustrate another example where router skipping may be applied, in accordance with an example implementation.

DETAILED DESCRIPTION

Figure 1A:
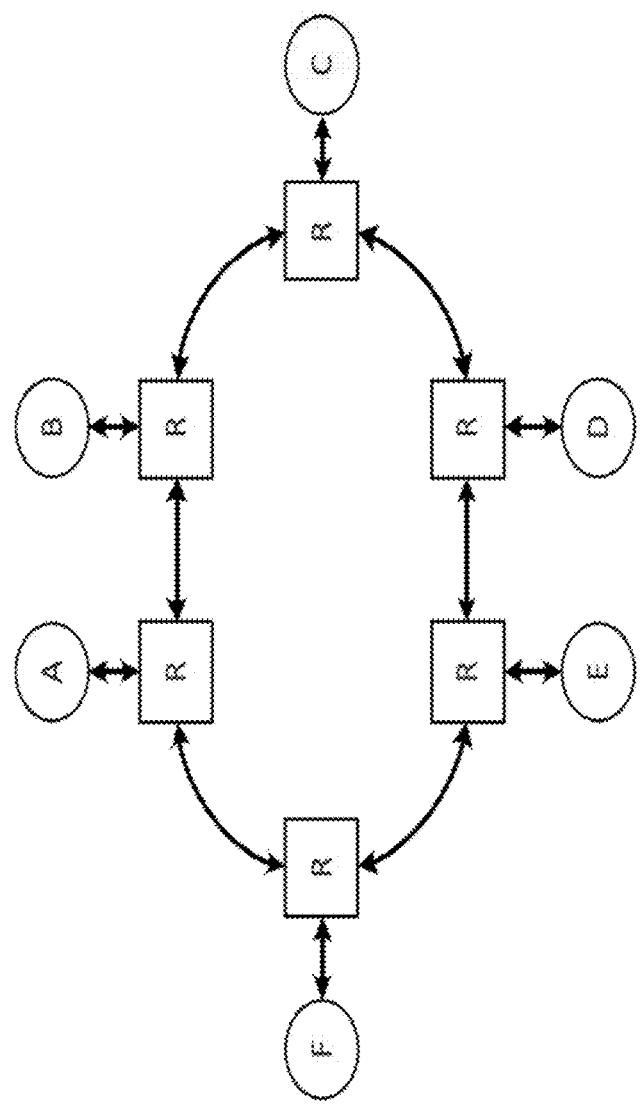
FIGS. 1(a), 1(b) 1(c) and 1(d) illustrate examples of Bidirectional ring, 2D Mesh, 2D Torus, and 3D Mesh NoC Topologies.
Figure 1B:
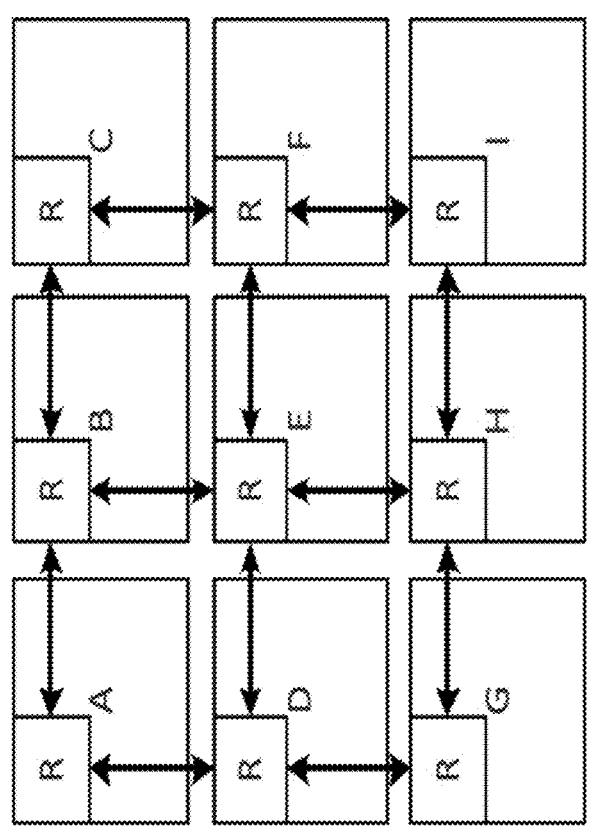
Figure 1C:
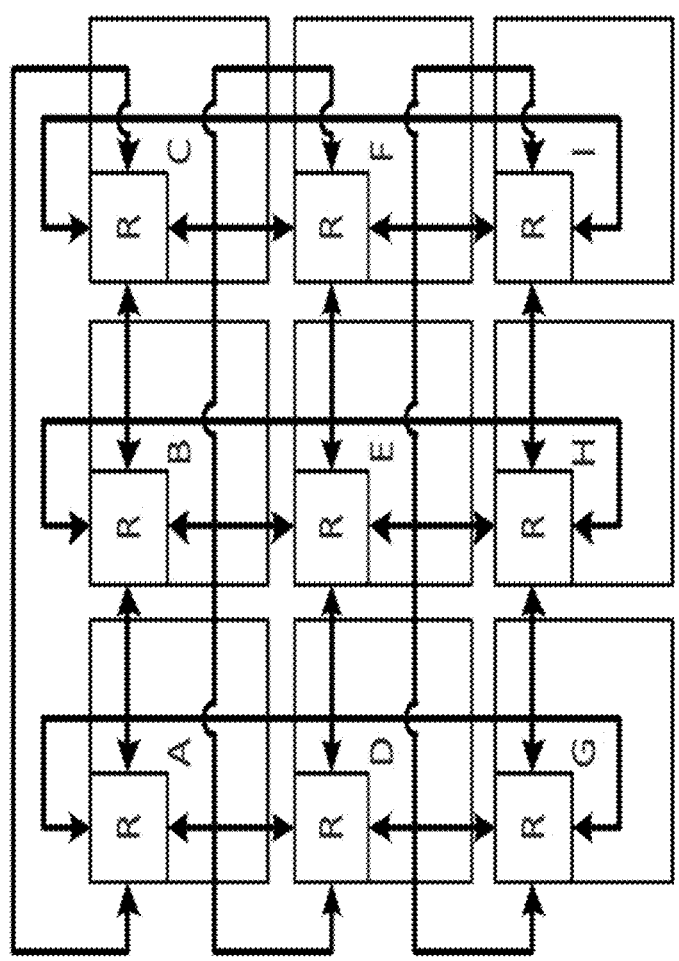
Figure 1D:
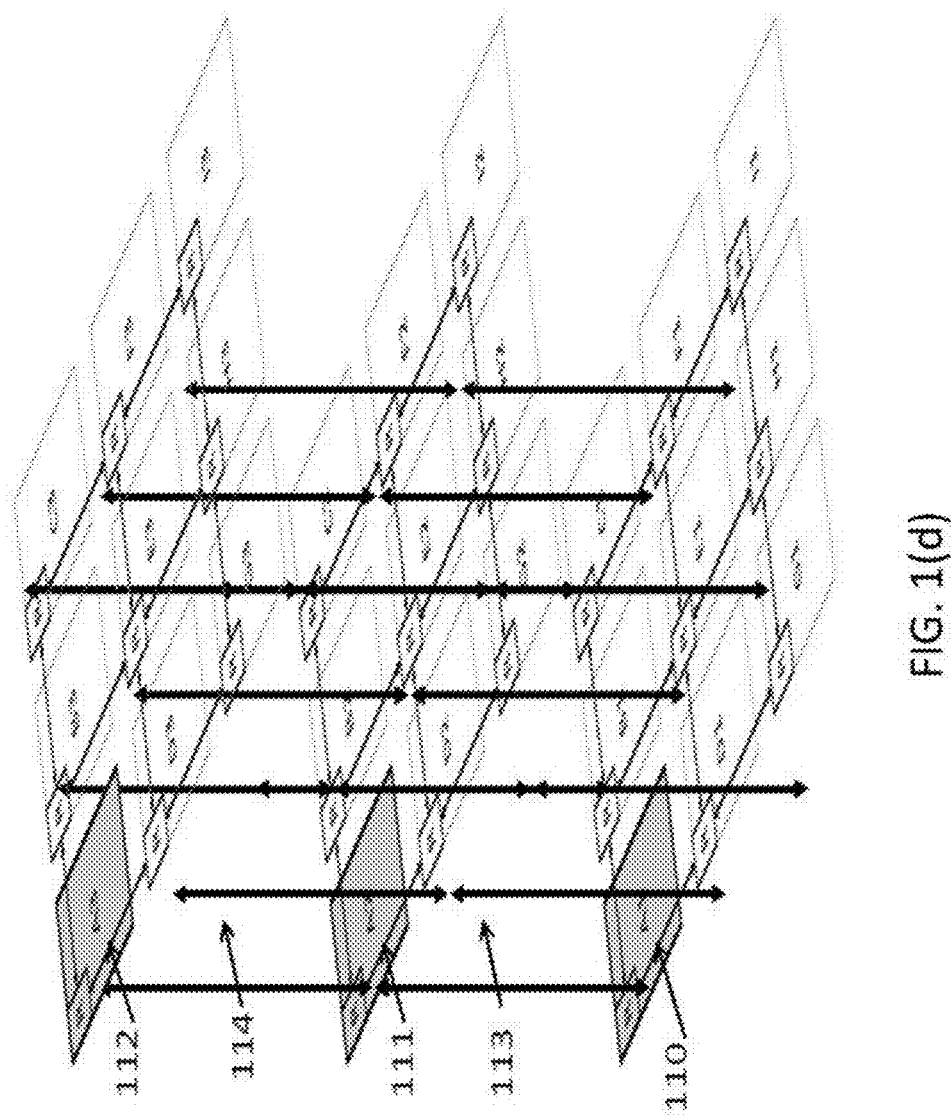
Figure 2A:
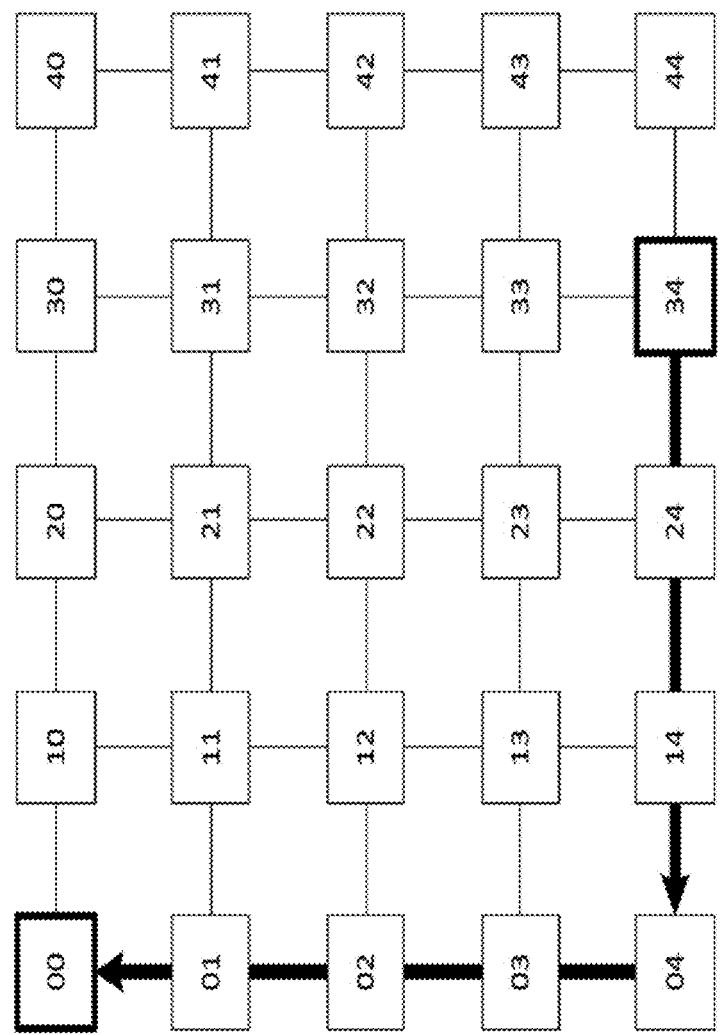
FIG. 2(a) illustrates an example of XY routing in a related art two dimensional mesh.
Figure 2B:
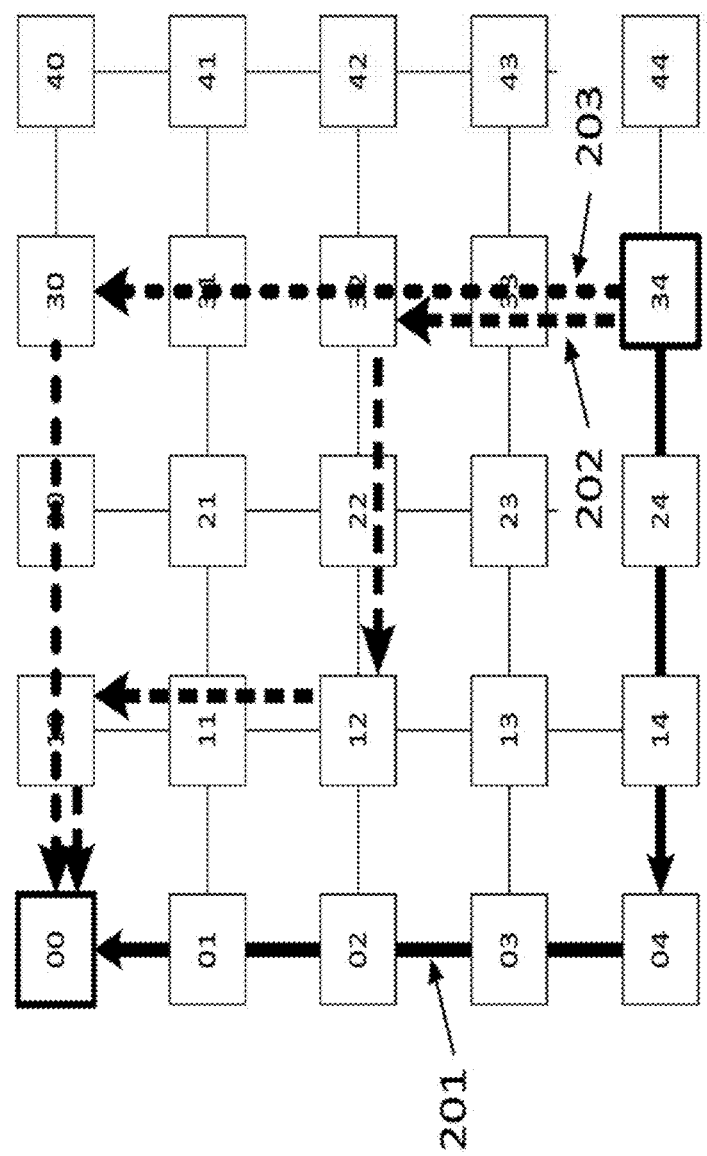
FIG. 2(b) illustrates three different routes between a source and destination nodes.
Figure 3A:
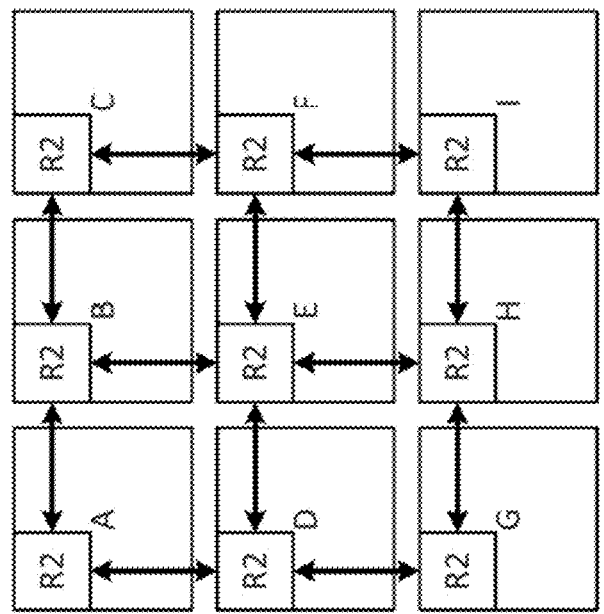
FIG. 3(a) illustrates an example of a related art two layer NoC interconnect.
Figure 3A:
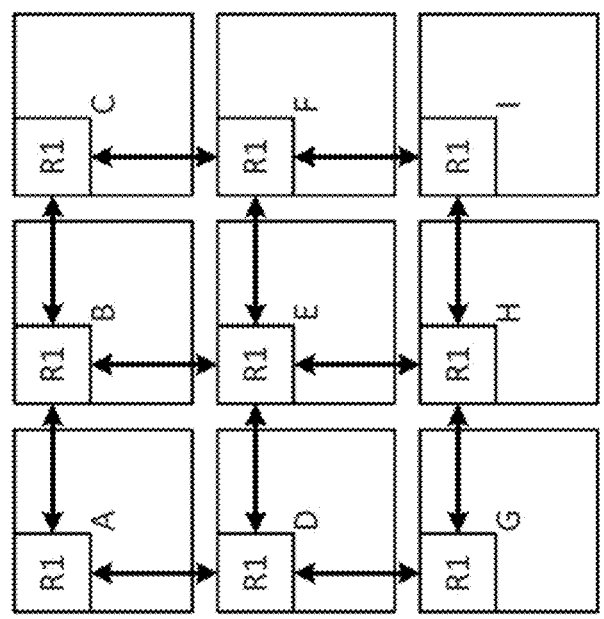
Figure 3B:
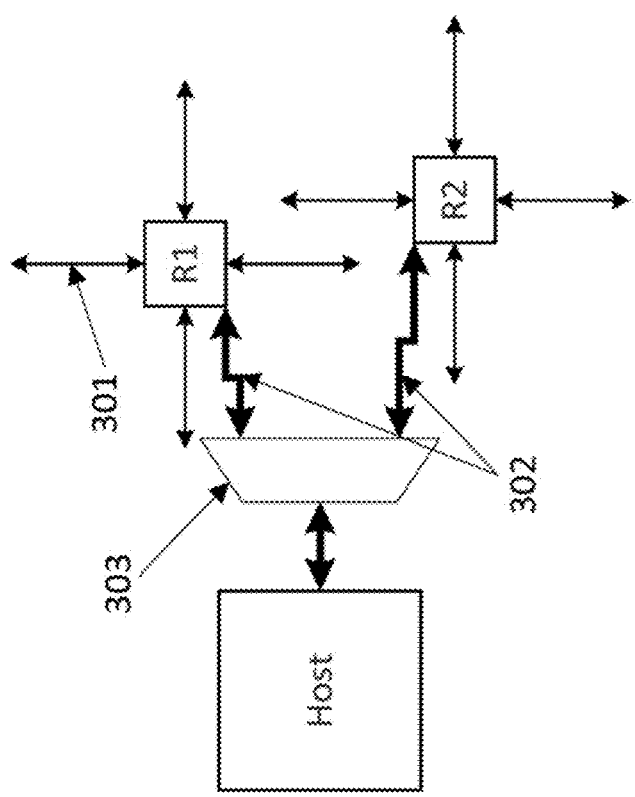
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Example implementations provided herein are directed to systems and methods that facilitate connection of hosts to any router in the NoC configuration. In this manner, multiple hosts can be connected to a router. The example implementations provide for automated optimization processes based on a cost function to facilitate configurations involving routers connected to multiple hosts.

The example implementations provide for optimizations that may otherwise induce high complexity in related art implementations. In the related art, for two adjacent hosts, each host may have to interact with their respective routers to communicate with each other. However, by utilization of the example implementations described herein, the hosts can connect to the same router, thereby reducing latency, wiring, and area, as only one router is needed to facilitate the connection between the two hosts.

Example implementations can involve iterative processes to facilitate automatic solutions that can involve multiple hosts connected to a single router or directly to each other. Example implementations described herein may also involve processes to remove routers that are not conducting arbitration or unused routers.

In one aspect, present disclosure provides for a method for configuring a Network on Chip (NoC) by determining one or more routers in the NoC that do not conduct arbitration between one or more channels of the NoC and remove the determined routers that do not conduct arbitration between the one or more channels of the NoC. The method can further be configured to reconnect hosts/agents of the channels associated with the removed routers to another router and/or bridge of a plurality of routers and bridges in the NoC. In another aspect of the present disclosure, the proposed method can further include determining a second set of routers that serve two directions only for the propose of I/O, removing the determined second set of routers, and directly connecting hosts that were earlier associated through the second set of routers. In yet another aspect of the present disclosure, the method can further include configuration of each unused directional port of one or more routers to connect with one or more hosts of the NoC during removal of the above-determined routers that do not conduct arbitration between the one or more hosts of the NoC.

In another aspect, the present disclosure relates to a method for configuring at least unused directional host port of a given router in the NoC to connect to one or more hosts of the NoC. The method can further include configuration of the unused directional host port of the router to connect to the one or more hosts based on a cost function. The method can even further include configuration of the unused directional host port of the router to connect to the hosts after removal of routers (in NoC) that do not conduct arbitration between the hosts of the NoC.

In yet another aspect, the present disclosure relates to a method of configuring a Network on Chip (NoC) by associating a probability distribution for each host in the NoC, wherein the probability distribution is indicative of a probability for connecting to one or more adjacent unused directional host ports of the each router. The method can further include generating a plurality of NoC configurations, wherein each of the plurality of NoC configurations can be based on a selection of one of the one or more adjacent unused directional host ports for the each host based on the probability distribution. The method can further include selecting a subset of the plurality of NoC configurations based on a cost function. In an implementation, the proposed method can further include updating the probability distribution for the each host based on the selected subset.

According to one example embodiment, the above method can further include iteratively repeating the steps of generating a plurality of NoC configurations, selecting a subset of the plurality of NoC configurations, and updating the probability distribution for the each host based on the selected subset until a probability threshold is reached for the probability distribution for the each port.

According to another example embodiment, the above method can further include iteratively repeating the steps of generating a plurality of NoC configurations, selecting a subset of the plurality of NoC configurations, and updating the probability distribution for the each host based on the selected subset until the subset of the plurality of configurations are identical. In yet another example embodiment, the above method can include updating the probability distribution based on a weighted average. In yet another example embodiment, the cost function can account for wire length of the NoC.

In another aspect, the present disclosure relates to a method for configuring a Network on Chip (NoC) by selecting a host from a plurality of hosts of the NoC based on a first probability function, selecting a connection for the selected host to one of an unused directional host port of one or more routers based on at least one of a second probability function and a weight, calculating cost of the NoC based on a cost function, updating the NoC based on the calculated cost and the selected connection. In one aspect, the step of updating the NoC can be implemented for the cost of the NoC being less than another cost of another NoC configuration and accepted based on a third probability function. In another aspect, the cost function can be based on a simulated annealing temperature function. In yet another aspect, the cost function can account for wire length of the NoC. In another aspect, the method can further include the step of assigning a weight to each connection between a host and a router from a weight calculation based on a bandwidth of the each connection and one or more bandwidth requirements.

For initialization of example implementations, immediate neighbor routers of each host are determined. For example, let hosts/agents be denoted as A1, A2 . . . An, and routers be denoted as R1, R2 . . . Rn. (e.g., A1=[R1, R2, R3]. A2=[R1 . . . R5], etc.), A cost function can also be defined based on any cost depending on the desired implementation, such as but not limited to, total latency, number of hops based on connectivity of the system, total system latency, wiring costs, number of routers, bandwidth target, bandwidth distance, weighted latency, and so forth. In an example implementation of the cost function, each flow can be associated with a weight and can be equal to bandwidth or latency of a particular flow, and the weighted latency is summation of the weight multiplied by the latency for all flows. In an example implementation involving a cost function for a latency target, deviation from a target latency for a flow can be penalized by the cost function, which can involve accounting for the total area of NoC, the function of the router area, the numbers of wires in the NoC and total wire length used, or any combination of these factors and other factors depending on the desired implementation.

First Example Implementation—Cross Entropy Optimization

Figure 4:
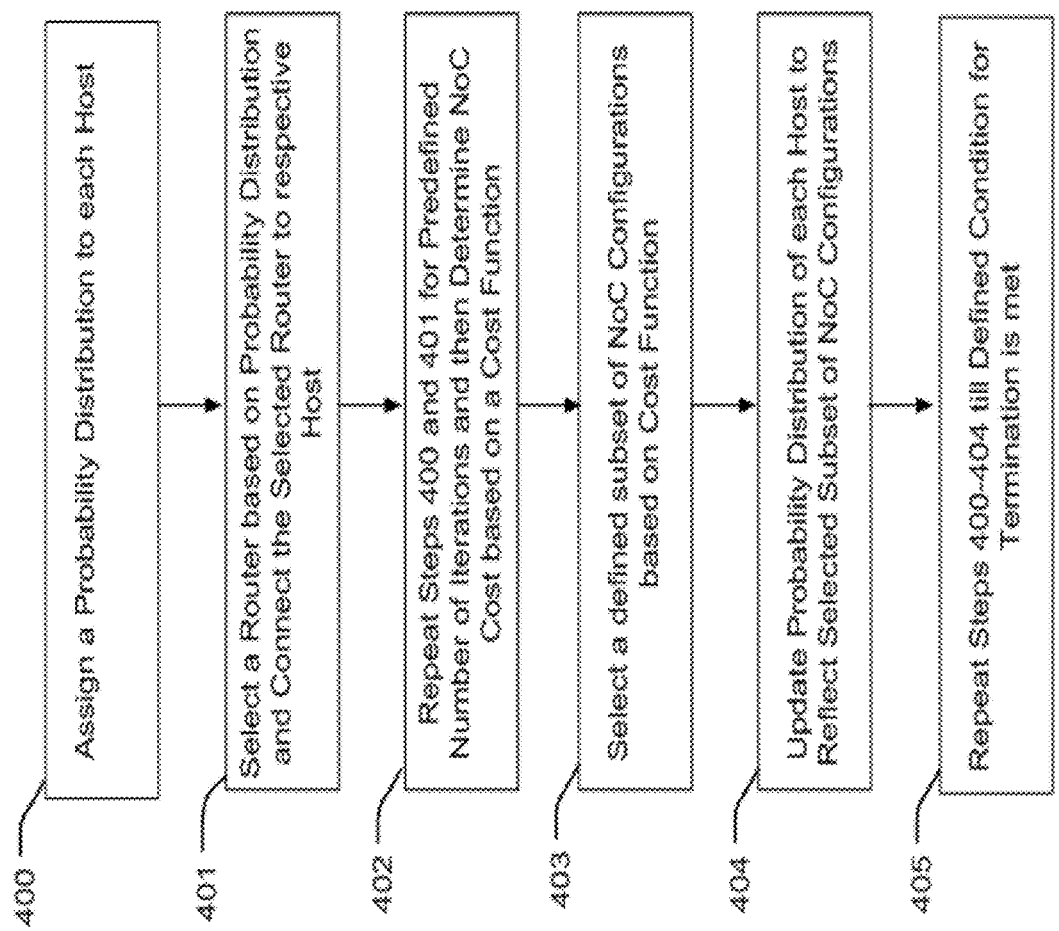
FIG. 4 illustrates a flow diagram according to an example implementation.

In a first example implementation, an iterative process may be utilized based on cross entropy optimization of the NoC configuration. FIG. 4 illustrates a flow diagram in accordance with an example implementation. The flow diagram of FIG. 4 provides an overview of an example implementation involving cross entropy optimization.

At 400, a probability distribution is assigned to each host. The probability distribution describes the chances for an agent or host i to connect to each adjacent router j, e.g. $P_i[R_j]$ such that sum $(P_i[R_1, R_2 \ldots R_j])=1$. For example, probability distribution for host $A_1$ can be $PA_1=[0.25, 0.5, 0.25]$ for its set of neighboring routers, or all equal, or can be initialized in other ways, depending on the desired implementation.

At 401, a router is selected based on the probability distribution, and the selected router is connected to the host. The selection can be done randomly based on the probability distribution. Each host can be traversed until each host in the NoC is connected to an adjacent router, thereby forming a NoC configuration.

At 402, the flow at 400 and 401 can be iterated a predetermined number of times until a predetermined number of NoC configurations are generated. The predetermined number of NoC configurations can be set depending on the desired implementation. After the predetermined number of NoC configurations are generated, cost of each of the NoC configurations can be determined based on a cost function.

At 403, a defined top subset of the generated NoC configurations can be selected based on the cost function, wherein the number to be included in the subset is not limited to any particular number and can depend on the desired implementation. At 404, from the selected subset, probability distribution of the each host can be updated to reflect the configurations selected. For example, if the subset involves multiple configurations where a host does not connect to a particular router due to the cost function, the probability for that connection can be reduced (e.g., to zero, by using a weighted average based on which routers were selected within the top subset, etc.). Similarly, for configurations where an agent often connects to a particular router, the probability can be increased proportionately to the number of times the connection occurred. In an example, for an agent/host $A_i$ where the router $R_j$ choice got selected $N_j$ times of total N configurations (top subset), the new probability of the configuration using router $R_j$ can be expressed as $P_i([R_j])+alpha*N_j/N)/(1+alpha)$, wherein alpha is the weight of the new choice and can be set based on the desired implementation.

At 405, flow from 400 can be repeated and terminated on a condition depending on the desired implementation. In one aspect, one example condition for termination can be when configurations are identical or the probabilities are very close to one for a router for each agent within a threshold, or a number of set iterations. For example, if the weighted probability of one choice goes over 0.9 or other desired threshold then the flow can terminate.

Second Example Implementation—Simulated Annealing

In a second example implementation, simulated annealing may be applied to the iterative process to generate a NoC configuration. The techniques described herein can also be utilized in conjunction with cross entropy optimization implementation as desired. For example, simulated annealing may be applied to weighted probability distribution as described above.

Figure 5:
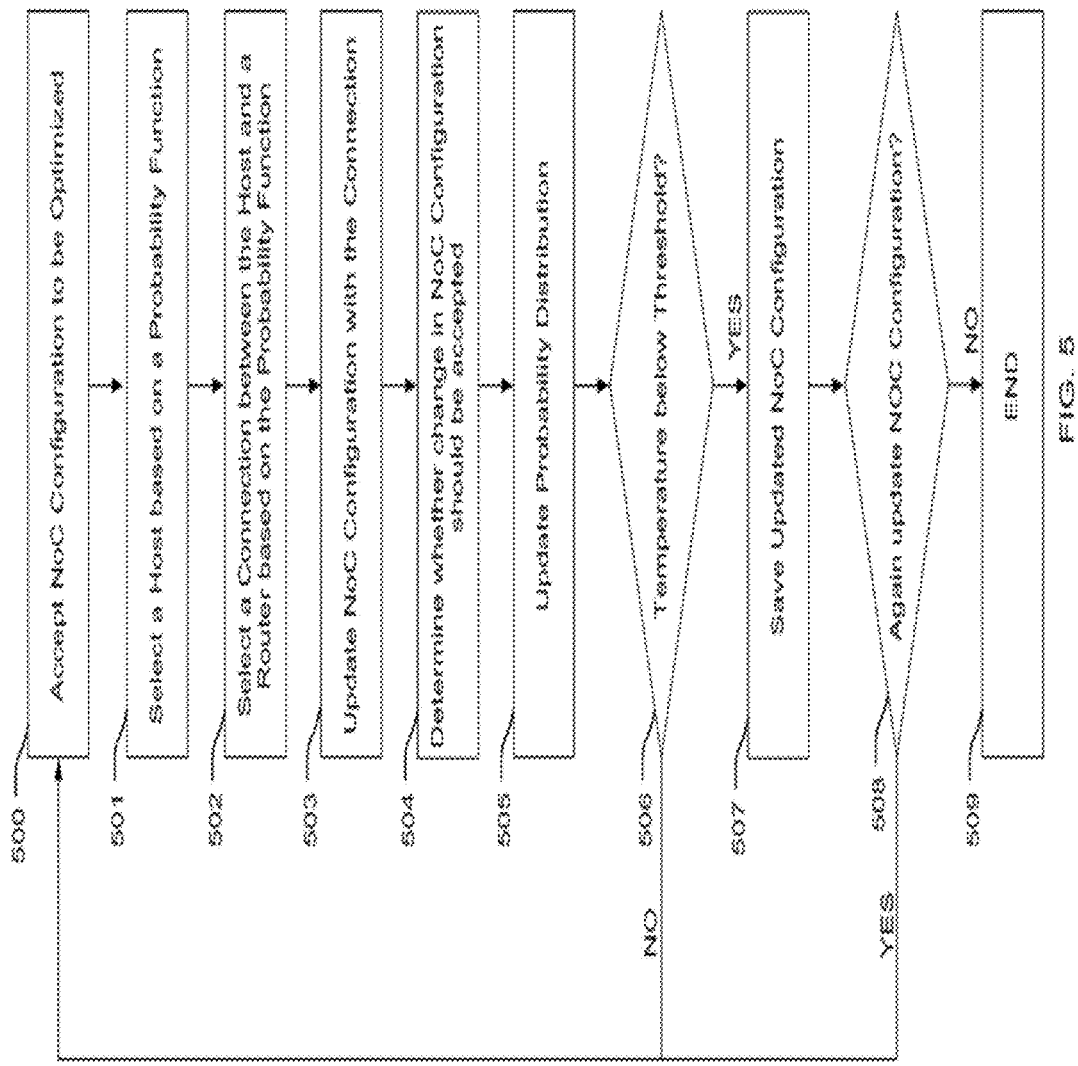
FIG. 5 illustrates a flow diagram according to an example implementation.

FIG. 5 illustrates a flow diagram in accordance with an example implementation. The flow diagram of FIG. 5 provides an overview of an example implementation involving simulated annealing.

At 500, a NoC configuration is provided for optimization. The NoC configuration can be a random configuration, or any configuration where optimization is desired, and can involve preset connections between hosts and routers. At 501, a host is selected based on a probability function. Each host/agent is associated with an initial probability function, which can be uniform or can be based on the topology. For example, hosts located closer to the center of the topology or hosts that have a larger number of adjacent neighbors can be set for higher probability selection.

At 502, a connection between a host and a router is selected. The connection can be selected based on the probability function, wherein the selection choices can be uniform or weighted depending on the desired implementation. At 503, the configuration is updated with the new connection by changing one of the connections of the selected host to be the new connection, and the cost is computed based on a cost function.

At 504, a determination is made as to whether to accept the change in configuration. The determination can be made based on one or more a combination of previous cost of the configuration, new cost, and a randomizing function. The randomizing function in this example implementation can be a temperature function, wherein the temperature can be initialized for the previous configuration, and new temperature $T(i+1)=T(i)*alpha$, where alpha is a weight less than one. For example, let the cost of new configuration be $C(i+1)$ and previous cost be $C(i)$ and previous temperature be $T(i)$. Selection can be made with probability of $P(Selection)=e^{[(C(i+1)-C(i))/T(i)]}$. In this manner, if $C(i+1)<C(i)$, the configuration can be accepted. Another example of P(Selection) can be $1/1+e^{[(C(i+1)-C(i)]/T(i)]}$. Thus if $C(i+1)<C(i)$, the configuration can be accepted, otherwise the new configuration is accepted with probability function.

At 505, the probability distribution is updated. For example, if the cost is reduced dramatically with the new configuration, the probabilities are renormalized so that the probabilities are increased for the new connection.

At 506, a determination is made as to whether the temperature falls below threshold from the flow at 504. If the temperature has not fallen below the threshold, the flow repeats at 500 with either the present NoC configuration or the previous NoC configuration depending on determination at 504. If the temperature has fallen below the threshold, the present configuration is saved at 507 and a determination can be made at 508 as to whether the NoC configuration needs to be again updated, wherein in case the NoC is to be again updated, the flow can be reiterated at 500 with a new, random configuration for a predetermined number of times, depending on the desired implementation, else the method can stop at step 509. Upon obtaining the predetermined number of configurations, configuration with the lowest cost can be selected for the NoC configuration.

To conduct initial probability assigning for each host in the NoC, a centroid determination can be used. For each host, all of the adjacent hosts can be determined, and centroid of those hosts can be determined from the topology. Bandwidth of each of the connections between hosts and adjacent hosts can also be incorporated in determining the centroid. For example, direction of flows and bandwidth for the flows can be determined and averaged out to initialize the probability based on analysis of bandwidth requirements at each quadrant, direction, and so forth of the NoC configuration.

Other considerations for probability distribution initialization can also be incorporated. For example, if NoC has certain physical constraints (e.g. a large host/agent may have its port to connect to the bridge in top left corner and have the router in bottom right), then the list of immediate routers may be adjusted accordingly.

Third Example Implementation—Router Skipping

Figure 6A:
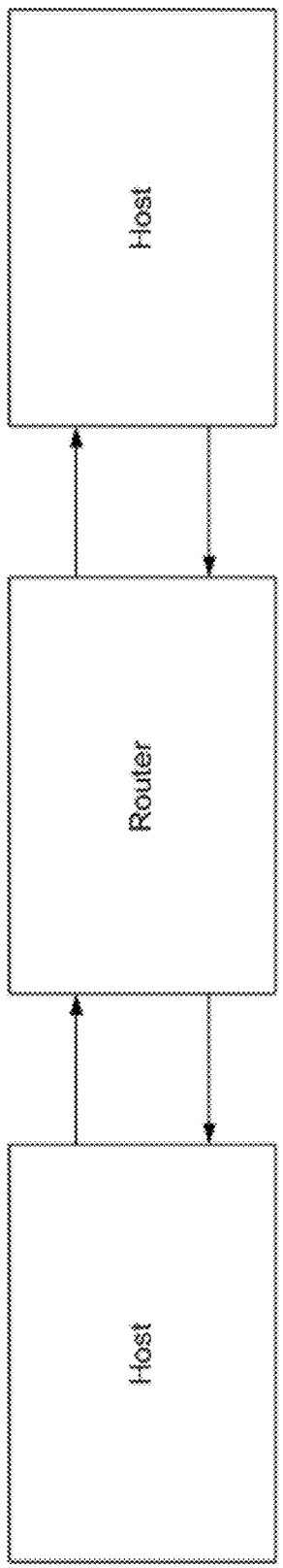
FIGS. 6(a) and 6(b) illustrate an example where router skipping may be applied, in accordance with an example implementation.
Figure 6B:
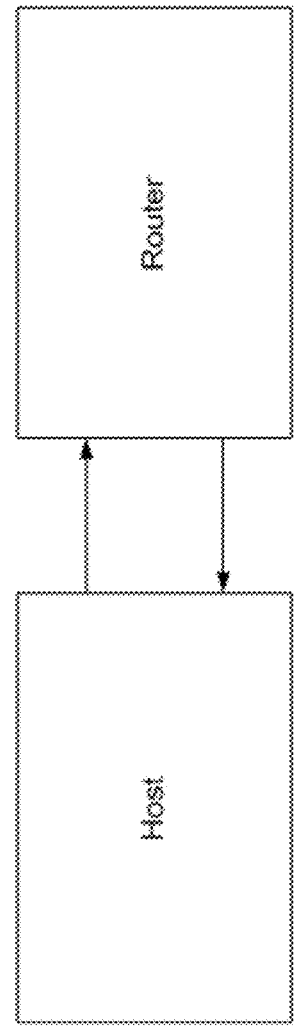

For further refinement, unused or unnecessary routers can be removed from the NoC. Refinement of the routers can be conducted during or after generating the NoC configuration, and/or before evaluating the cost of the configuration as described with respect to FIGS. 4 and 5. FIGS. 6(a) and 6(b) illustrate an example where router skipping may be applied, in accordance with an example implementation.

In FIG. 6(a), the NoC configuration involves two hosts connected to a router that is only serving two directions for input and output, and is not conducting any arbitration to other routers. The routers can then be removed to have the hosts connect to each other directly, as illustrated in FIG. 6(b). The connection directly between the hosts can be facilitated by a bridge.

FIGS. 7(a) and 7(b) illustrate another example where router skipping may be applied, in accordance with an example implementation. Suppose two hosts are connected to two different routers and two routers are hopped as illustrated in FIG. 7(a). In such a situation, the routers can be consolidated. As illustrated in the example of FIGS. 6(a) and 6(b), when a router that is not conducting any arbitration is identified, the router can be removed or consolidated into another router, as illustrated in FIG. 7(b).

Fourth Example Implementation—Connection of Unused Ports to Agents

For routers located on an edge of the NoC, directional ports might be unused for ports directed to the edge of the NoC. In this situation, the directional ports can be used to connect to other hosts. Such a situation can also apply to generated configurations that contain routers with unused directional ports that are not disposed at the edge of the NoC. The selection of a connection between the unused port and one of the hosts of the NoC can be conducted based on the cost function, such as bandwidth, latency or other criteria. Such a host need not be adjacent to the router and can be connected, for example, by wire. As with the third example implementation, the connections can be established before applying the cost function, or after applying the cost function and reiterated to determine connections between unused ports and routers that would reduce the cost function.

Figure 8:
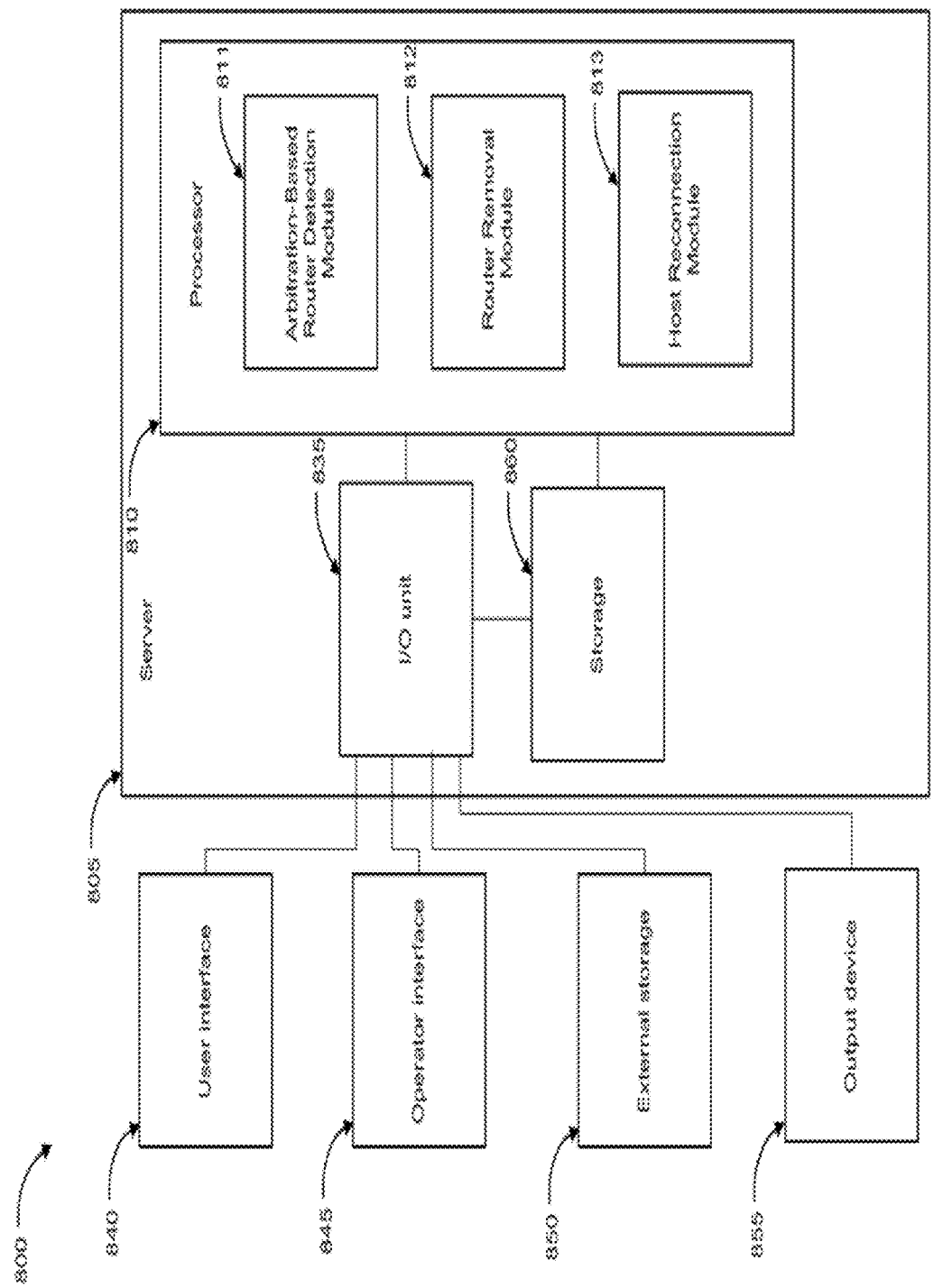
FIG. 8 illustrates a computer/server block diagram upon which the example implementations described herein may be implemented.

FIG. 8 illustrates an example computer system 800 on which example implementations may be implemented. Computer system 800 includes a server 805, which may involve an I/O unit 835, storage 860, and a processor 810 operable to execute one or more units as known to one of skill in the art. The term "computer-readable medium" as used herein refers to any medium that participates in providing instructions to processor 810 for execution, which may come in the form of computer readable storage mediums, such as, but not limited to optical disks, magnetic disks, read-only memories, random access memories, solid state devices and drives, or any other types of tangible media suitable for storing electronic information, or computer readable signal mediums, which can include media such as carrier waves. The I/O unit processes input from user interfaces 840 and operator interfaces 845 which may utilize input devices such as a keyboard, mouse, touch device, or verbal command.

The server 805 may also be connected to an external storage 850, which can contain removable storage such as a portable hard drive, optical media (CD or DVD), disk media or any other medium from which a computer can read executable code. The server may also be connected an output device 855, such as a display to output data and other information to a user, as well as request additional information from a user. The server 805 may be connected to the user interface 840, the operator interface 845, the external storage 850, and the output device 855 via wireless protocols, such as the 802.11 standards, Bluetooth® or cellular protocols, or via physical transmission media, such as cables or fiber optics. The output device 855 may therefore further act as an input device for interacting with a user.

The processor 810 may execute one or more modules including an arbitration-based router detection module 811, router removal module 812, and a host reconnection module 813. In an embodiment, arbitration-based router detection module 811 can be configured to determine one or more routers in a given NoC interconnect architecture that do not conduct arbitration between one or more channels of the NoC. Router removal module 812, on the other hand, can be configured to remove the determined routers that do not conduct arbitration between the one or more channels of the NoC. Host reconnection module 813, on the other hand, can be configured to reconnect hosts/agents of the channels associated with the removed routers to another router and/or bridge of a plurality of routers and bridges in the NoC.

In some example implementations, the computer system 800 can be implemented in a computing environment such as a cloud. Such a computing environment can include the computer system 800 being implemented as or communicatively connected to one or more other devices by a network and also connected to one or more storage devices. Such devices can include movable user equipment (UE) (e.g., smartphones, devices in vehicles and other machines, devices carried by humans and animals, and the like), mobile devices (e.g., tablets, notebooks, laptops, personal computers, portable televisions, radios, and the like), and devices designed for stationary use (e.g., desktop computers, other computers, information kiosks, televisions with one or more processors embedded therein and/or coupled thereto, radios, and the like).

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method for configuring a Network on Chip (NoC), comprising:
   determining a first set of routers from a plurality of routers in the NoC that do not conduct arbitration between one or more channels of the NoC; and
   for the determined first set of routers in the NoC that do not conduct arbitration between the one or more channels of the NoC:
      remove the first set of routers that do not conduct arbitration between the one or more channels of the NoC; and
      reconnect one or more hosts of the channels associated with the removed first set of routers to another router or bridge of the plurality of routers and bridges in the NoC.

2. The method of claim 1, further comprising
   determining a second set of routers serving two directions only for I/O;
   removing said second set of routers; and
   directly connecting hosts of the one or more channels of the NoC that were associated with the removed second set of routers.

3. The method of claim 1, further comprising configuring each unused directional host port of a third set of routers to connect to one or more hosts of the NoC during removal of the first set of routers that do not conduct arbitration between the one or more hosts of the NoC.

4. A method for a Network on Chip (NoC), comprising:
   configuring each unused directional and host port of a plurality of routers in the NoC to connect to one or more hosts of the NoC;
   wherein the configuring the each unused directional host port of the plurality of routers to connect to the ones of the one or more hosts of the NoC is based on a cost function;
   wherein the configuring the each unused directional host port of the plurality of routers to connect to the one or more hosts of the NoC is conducted after removal of determined ones of the plurality of routers that do not conduct arbitration between the one or more hosts of the NoC.

5. A method for a Network on Chip (NoC), comprising:
   associating a probability distribution to each host in the NoC, the probability distribution indicative of a probability for connecting said host to one or more adjacent unused directional host ports of each router of a plurality routers in the NoC;
   generating a plurality of NoC configurations, wherein each of the plurality of NoC configurations is based on a selection of at least one of said one or more adjacent unused directional host ports for the each host based on the probability distribution; and
   selecting a subset of the plurality of NoC configurations based on a cost function.

6. The method of claim 5, further comprising updating the probability distribution for the each host based on the selected subset.

7. The method of claim 6, wherein the generating, the selecting and the updating is iteratively repeated until a probability threshold is reached for the probability distribution for the each port.

8. The method of claim 6, wherein the generating, the selecting and the updating is iteratively repeated until the subset of the plurality of configurations are identical.

9. The method of claim 6, wherein the updating the probability distribution is based on a weighted average.

10. The method of claim 5, wherein the cost function accounts for wire length of the NoC.

11. A method for a Network on Chip (NoC), comprising:
selecting a host from a plurality of hosts of the NoC based on a first probability function;
selecting a connection for the selected host to one of an unused directional host port based on at least one of a second probability function and a weight;
calculating a cost of the NoC based on a cost function; and
updating the NoC based on the calculated cost and the selected connection.

12. The method of claim 11, wherein the updating the NoC is conducted for the cost of the NoC being less than another cost of another NoC configuration and accepted based on a third probability function.

13. The method of claim 12, wherein the cost function is based on a simulated annealing temperature function.

14. The method of claim 12, wherein the cost function accounts for wire length of the NoC.

15. The method of claim 12, further comprising assigning a weight to each connection between a host and a router from a weight calculation based on a bandwidth of the each connection and one or more bandwidth requirements.

16. The method of claim 15, wherein the second probability function comprises a centroid calculation of one or more weights associated with one or more connections of the selected host.

* * * * *